United States Patent [19]

Losic et al.

[11] Patent Number: 5,020,125
[45] Date of Patent: May 28, 1991

[54] SYNTHESIS OF LOAD-INDEPENDENT DC DRIVE SYSTEM

[76] Inventors: Novica A. Losic, 4755-79 St., Kenosha, Wis. 53142; Ljubomir D. Varga, Deskaseva 6, 11000 Beograd, Yugoslavia

[21] Appl. No.: 323,630

[22] Filed: Nov. 4, 1988

Related U.S. Application Data

[62] Division of Ser. No. 174,148, Nov. 1, 1988, abandoned.

[51] Int. Cl.⁵ ............................................. H02P 7/00
[52] U.S. Cl. .................................... 388/811; 388/815; 388/812; 318/809; 318/811; 318/812; 318/606
[58] Field of Search .............................. 323/285–287; 363/21, 97; 318/615–618, 650, 825–829, 830–831, 804, 811, 606, 798, 812, 807; 388/809–815

[56] References Cited

U.S. PATENT DOCUMENTS

| | | |
|---|---|---|
| 4,293,812 | 10/1981 | Kubach et al. ................... 323/272 |
| 4,456,872 | 6/1984 | Froeschle ......................... 363/21 X |
| 4,491,777 | 1/1985 | Beck et al. ......................... 318/571 |
| 4,578,631 | 3/1986 | Smith ............................ 323/285 X |
| 4,672,518 | 6/1987 | Murdock ......................... 363/80 X |
| 4,704,568 | 11/1987 | Beck et al. ......................... 318/687 |
| 4,876,494 | 10/1989 | Daggett et al. ............... 318/568.22 |

Primary Examiner—William M. Shoop, Jr.
Assistant Examiner—D. Martin

[57] ABSTRACT

A method of synthesizing load invariant dc drive system comprising positive armature current feedback of exactly specified nature and value of its transfer function. The system transfer function independent of load is realized while stability and dynamics of the system are controlled by additional voltage loop.

3 Claims, 3 Drawing Sheets

SYNTHESIS OF LOAD-INDEPENDENT DC DRIVE SYSTEM

FIELD OF THE INVENTION

This invention relates to drive systems and more particularly to dc drive system using both current and voltage feedback loop to control the output angular and velocity change of the motor shaft when load torque changes by making the system independent of the load.

BACKGROUND OF THE INVENTION

Previous studies show the classical approach of using only negative feedback in controlling dynamic and steady-state performance of control systems. See, for example, N. K. Sinha, "Control Systems", Holt, Rinehart and Winston, 1986, pp. 59-70, G. H. Hostetter et al, "Design of Feedback Control Systems", Holt, Rinehart and Winston, 1982, pp. 3-5, B. C. Kuo, "Automatic Control Systems", Prentice-Hall, Inc., 4th Ed., 1982, pp. 3-16.

In the field of drive systems including dc drives this classical approach is maintained as seen from B. K. Bose, "Microcomputer Control of Power Electronics and Drives", IEEE Press, 1987.

The ultimate load regulation performance in drive systems should be invariant to the change of load and limited only by the physical properties of the system, such as the finite energy level of available sources, finite energy dissipation capability of available components and finite speed of the transition of control signals. Such an ultimate performance has not been achieved using the classical approach of controlling the drive system with only negative feedback loops.

SUMMARY OF THE INVENTION

It is therefore an object of the present invention to provide a control method and associated circuit to achieve complete load independence in dc drive systems.

Another object of the present invention is to provide a control circuit which is simple.

Briefly, for use with a dc drive system, the preferred embodiment of the present invention includes a positive armature current feedback loop within a negative voltage feedback loop, the transfer function of feedback network in the current loop being synthesized as derivative and proportionate where these two functions are easily realized using a differentiator circuit with a dc path.

The transfer function of feedback network in current loop, as the algorithm of this novel method, for which the system becomes load-independent is given as $$H(s) = (R_a + sL_s)/[R(R_4/R_3)A] \quad (1)$$

where $R_a$ is motor armature resistance, $L_s$ is total inductance in the motor armature circuit consisting of the sum of armature inductance and any series inductance, R is resistance of the current sense resistor and $R << R_a$, $R_4/R_3$ is gain of isolating differential amplifier in the armature current sensing circuit, and A is voltage gain of motor PWM control and power stage.

It should be noted that Eq.(1) holds if a current sense transformer is used by replacing R with m where m is a constant of proportionality between output voltage and input current of the current sense transformer.

The ability to provide a load-independent dc motor drive system, the performance of which is invariant to the changes of the load torque in both steady state and transient, is a material advantage of the present invention.

Another advantages of the present invention include its ability to be realized in an integrated-circuit (IC) form; the provision of such a method which simplifies design of negative voltage feedback loop for optimum system performance; and the provision of such a method which provides zero output-angular-change-to-load-torque-change transfer function.

These and other objects and advantages of the present invention will no doubt be obvious to those skilled in the art after having read the following detailed description of the preferred embodiment which is illustrated in the FIGURES of the drawing.

DETAILED DESCRIPTION

Figure 1:
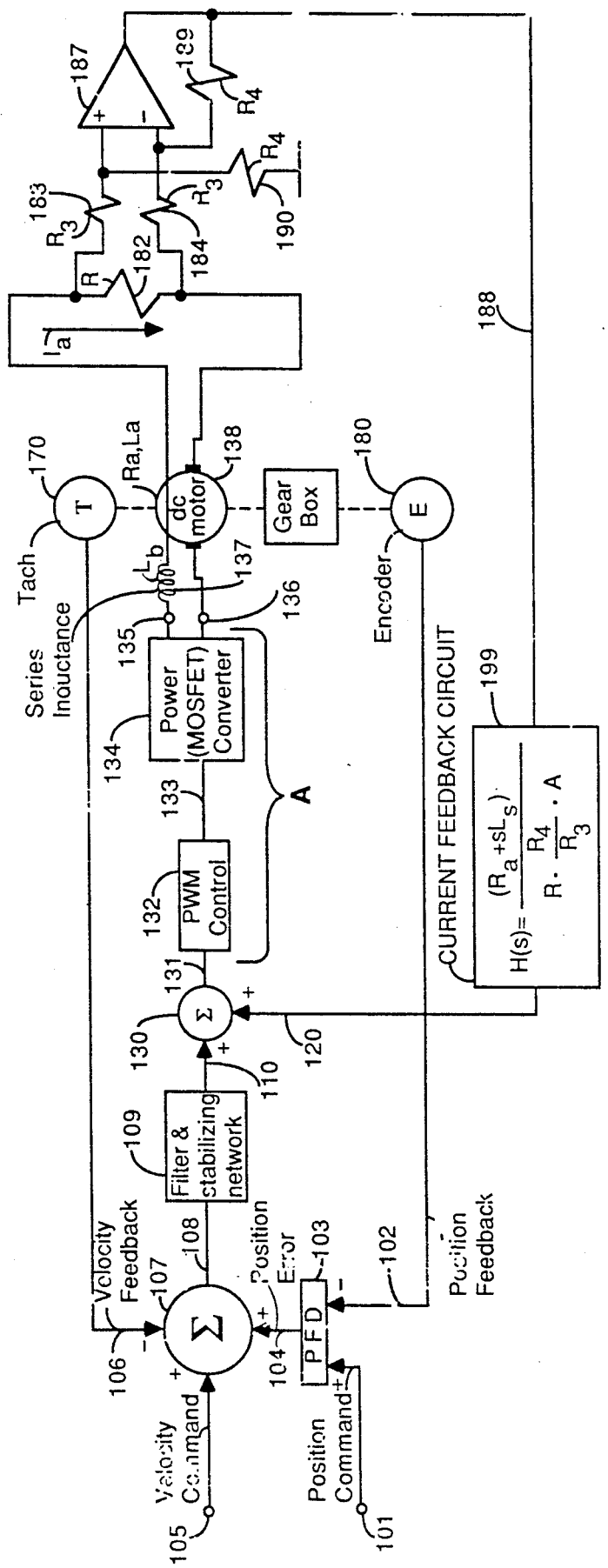
FIG. 1 is a block and schematic diagram of the presently preferred embodiment in accordance with the present invention.

A dc drive system embodying the principles of the invention is shown in FIG. 1. In FIG. 1, it is assumed that input voltage $V_{in}$ (not illustrated) applied to the power stage 134 is constant so that gain constant A characterizes transfer function of the PWM control 132 and power stage 134. Therefore the signal applied to lead 131 is voltage-amplified A times to appear as the motor armature voltage between terminals 135 and 136 with an associated current/power supplied by the dc input voltage source $V_{in}$.

The dc drive system in FIG. 1 incorporates an inner positive armature current feedback loop within velocity and position negative voltage feedback loops; an armature voltage negative feedback (not illustrated) can be included if desired without changing the principles of operation of the embodiment. The inner positive armature current feedback loop incorporates current feedback circuit 199 which is an active network whose transfer function is H(s). The purpose of the positive current feedback loop is to make the system load invariant, which it does for the transfer function H(s) synthesized as given in Eq.(1) and shown in FIG. 1 as it will be explained shortly. The purpose of the negative voltage feedback loop(s) is to stabilize the system and control its dynamics by means of the filtering and stabilizing network 109.

In operation, the output angular velocity and position are monitored by tach 170 and encoder 180, respectively. In most practical installations tach is installed on motor shaft and encoder after the gear box; this has been preserved in FIG. 1, however other installations of these two devices are possible without changing the principles of operation of the embodiment. The velocity feedback voltage signal is applied by lead 106 to the summing circuit 107 where it is summed with the velocity command voltage applied to terminal 105 and with the position error voltage signal applied by lead 104. The position error voltage signal on lead 104 is produced by the phase/frequency detector (PFD) 103 which compares frequency and phase of the position command train of pulses applied to terminal 101 with frequency and phase of the encoder train of pulses provided by lead 102. The resulting error voltage at the output of the summing circuit 107 is applied by lead 108 to filtering and stabilizing network 109 where it is processed and applied by lead 110 to summing circuit 130.

The motor armature current $I_a$ is measured by current sense resistor 182 whose resistance is R. The current sense voltage $RI_a$ is buffered and amplified $R_4/R_3$ times in differential amplifier 187 connected such that its input terminals are connected via resistors 183 and 184 across the current sense resistor 182; resistor 190 is connected between noninverting input terminal of the amplifier 187 and ground; resistor 189 is connected in the negative feedback path of the amplifier 187, and the values of the resistors 183 and 184 are equal resistances $R_3$ while resistors 190 and 189 are of equal resistances $R_4$. The output of the differential amplifier 187 is applied by lead 188 to current feedback circuit 199 whose transfer function is H(s). The current sense signal obtained and processed in this manner is then added to the error signal supplied and processed by the external velocity and position feedback loops. The addition of the signals takes place in the summing circuit 130 into which the current feedback signal is fed by lead 120 and the error signal due to the velocity and position feedback loops is fed by lead 110.

The resulting control voltage is applied by lead 131 to PWM control and isolating stage 132 which in turn controls the power converter 134 by providing control pulses on lead 133. (Of course, lead 133 consists of more than one line and the representation here is conceptual). The power converter 134 can be realized with power BJTs or power MOSFETs. It operates as a dc-to-dc converter (chopper). The armature voltage available at the converter output terminals 135 and 136 drives dc motor 138 so as to control its speed and angular shaft position. The motor 138 is characterized by its armature resistance $R_a$ and inductance $L_a$ and in series with the motor 138 an additional inductance $L_b$ can be added by connecting inductor 137 as shown in FIG. 1. Total inductance is $L_s = L_a + L_b$.

Figure 2:
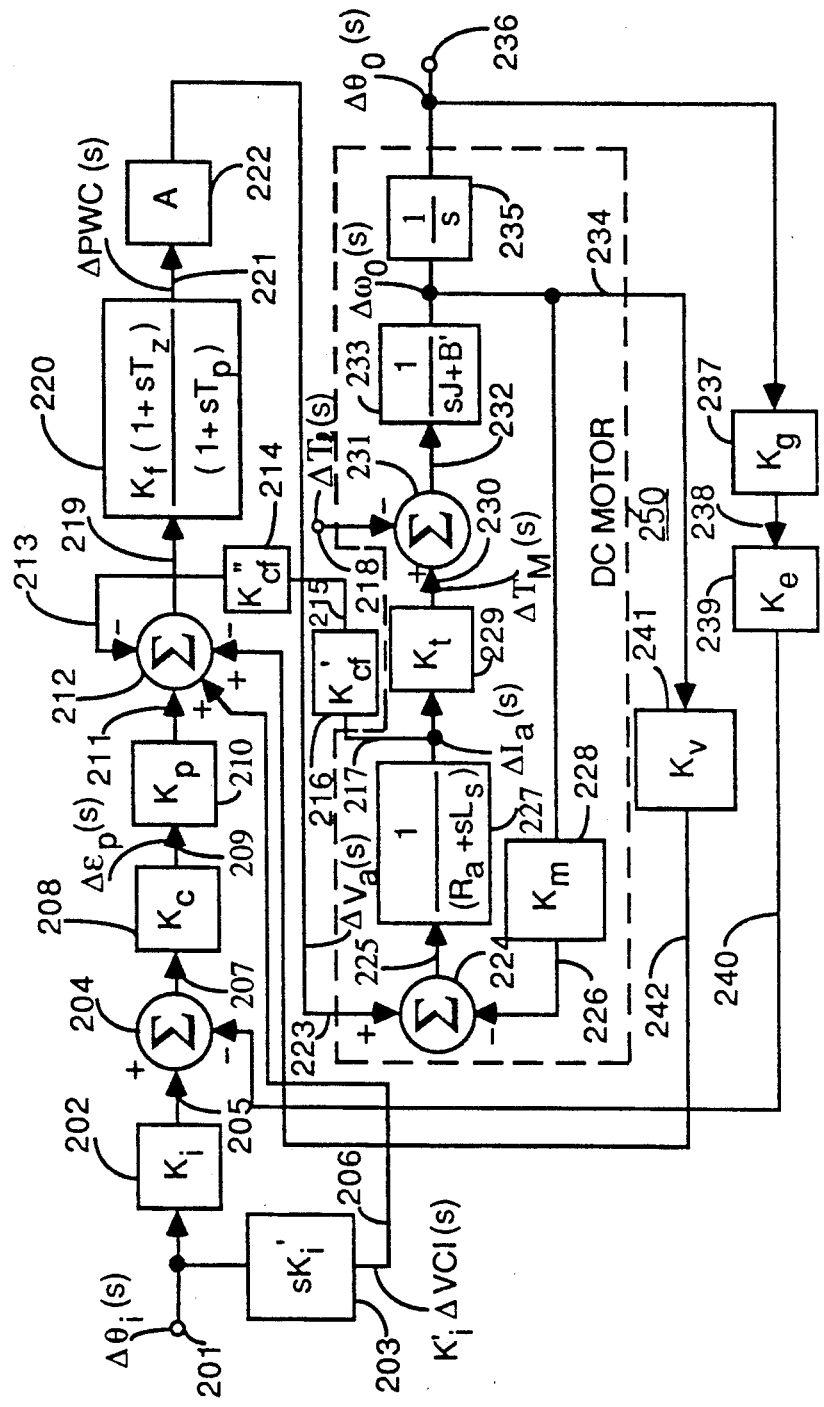
FIG. 2 is a block diagram of a dc drive system.

FIG. 2 gives the detailed block diagram of a dc motor drive system necessary to derive the synthesis method resulting in the closed form expression given in Eq.(1) and shown in FIG. 1 as the required form of the transfer function H(s) of the current feedback circuit.

In FIG. 2, the incremental Laplace-transformed input angular position command $\Delta\Theta_i(s)$ is applied at input terminal 201 to cause a corresponding incremental output angular position change $\Delta\Theta_o(s)$ at output terminal 236. An external load torque disturbance $\Delta T_f(s)$ is applied at point 218 causing an additional change of the output angular position $\Delta\theta_o(s)$. Block 202 is characterized by constant $K_i$[pulses/radian] so that train of command pulses is produced on lead 205 in order to be summed in a summing circuit 204 with the train of feedback pulses provided by lead 240. Output 207 of the summing circuit 204 provides a number of pulses equal to the difference of the numbers of pulses applied to its inputs 205 and 240. The differentiating block 203 is characterized by transfer function $sK'_i$ given in [V/radian] so that its output 206 provides the incremental velocity command input whose scaled value $K'_i\Delta V$-CI(s) is applied as voltage by lead 206 to a summing circuit 212. The train of pulses available on lead 207 is applied to a D/A converter 208 characterized by a gain constant $K_c$[V/pulses] so that an incremental position error in voltage form $\Delta\epsilon_p(s)$ is produced at its output 209 and applied to a block 210 providing gain $K_p$. An incremental position error in voltage form and in the amount of $K_p\Delta\epsilon_p(s)$ is available on lead 211 by which it is applied to the summing circuit 212. The output angular shaft position change $\Delta\theta_o(s)$ at output terminal 236 is reduced in a gear box 237 by a gear ratio $K_g$ and applied by lead 238 to an optical encoder 239 characterized by gain $K_e$[pulses/rad] so that a train of pulses is available on lead 240. The angular velocity change of the motor shaft $\Delta\omega_o(s)$ is monitored by tach 241 characterized by $K_v$[V/rev/min] and connected by line 234 to the respective point. The tach voltage signal is applied by lead 242 to the summing circuit 212. The armature current change $\Delta I_a(s)$ is monitored by current sense circuit 216 characterized by a constant $K'_{cf}$[V/A] and connected by line 217 to the respective point. The current sense voltage is applied by lead 215 to a current feedback circuit 214 characterized by a constant $K''_{cf}$. The current feedback loop is closed by lead 213 which applies the processed current sense voltage to the summing circuit 212. As seen so far from FIG. 2 all three feedback loops closed: position, velocity, and current are of negative type.

The total control signal voltage is applied by lead 219 to a filtering and stabilizing network 220 whose transfer function is usually realized as $K_f(1+sT_z)/(1+sT_p)$ but other realizations are possible too. The incremental pulse width command voltage $\Delta PWC(s)$ is applied by lead 221 to a PWM control and power stage 222 whose voltage gain is A. The power stage applies controlled change of armature voltage $\Delta V_a(s)$ by line 223 to the dc motor 250. The dc motor 250 is characterized by back emf constant $K_m$[V/rad/sec], armature resistance $R_a$, armature inductance plus any series inductance $L_s$, torque constant $K_t$ which can be given in the same units as constant $K_m$, moment of inertia J[lb-in-sec$^2$], viscous friction torque coefficient B', and its equivalent block diagram is shown inside the dashed block 250. In this equivalent block diagram the armature voltage $\Delta V_a(s)$ on line 223 is opposed by the back emf voltage on line 226 so that the resulting voltage is available at the output 225 of a summer 224. The voltage at line 225 produces armature current $\Delta I_a(s)$ through impedance 227 of value $(R_a+sL_s)$. The motor torque $\Delta T_M(s)$ is produced on line 230 by passing the armature current $\Delta I_a(s)$ through block 229 characterizing the ability of producing the torque by the constant $K_t$. The motor torque is opposed by an external load torque increment $\Delta T_f(s)$ supplied at point 218 so that the resulting torque is available at the output 232 of a summer 231. The torque on line 232 produces an increment of the angular velocity of the motor shaft $\Delta\omega_o(s)$ at the output of a block 233 characterized by the transfer function $[1/(sJ+B')]$. The back emf is produced in the motor at the output of block 228 characterized by constant $K_m$ and fed by $\Delta\omega_o(s)$. The incremental output angular position change $\Delta\Theta_o(s)$ is produced at point 236 after integrating $\Delta\omega_o(s)$ by an integrator 235 whose transfer function is 1/s.

Dynamic stiffness is defined as a measure of displacement in transient of output shaft angular position $\Delta\Theta_o(t)$ due to a load torque disturbance $\Delta T_f(t)$, for input angular position command change $\Delta\Theta_i(t)=0$.

The dynamic stiffness of the system in FIG. 2 is $$S_{dcf}(s) = -\Delta T_f(s)/\Delta\Theta_o(s) = [sT_2(s) + K'_p T_1(s)]/T_3(s) \quad (2)$$

where, for $R << R_a$ $$T_1(s) = AK_f K_t(1+sT_2)$$

$$T_2(s) = AK_t K_v K_f(1+sT_2) + (1+sT_p)$$
$$[(R_a+sL_s)(sJ+B') + K_m K_t] + K_{cf} K_f A(1+sT_2)$$

$$T_3(s) = -[(1+sT_p)(R_a+sL_s) + K_{cf} K_f A(1+sT_2)] \quad (3)$$

$$K'_p = K_g K_e K_c K_p$$

$$K_{cf} = K'_{cf} K''_{cf} \quad (4)$$

From Eq.(2) the system becomes load independent for $T'_3(s)=0$.

Substituting the requirement above into Eq.(3) yields for the gain function characterizing the armature current feedback circuit and given originally in Eq.(4) as a constant, a complex function $$K_{cf}(s) = K'_{cf} K''_{cf}(s) = -[(1+sT_p)(R_a+sL_s)]/[-K_f A(1+sT_2)] \quad (5)$$

With reference to FIG. 2, Eq.(5) implies that a positive armature current feedback loop incorporating circuit whose transfer function is $$H(s) = (R_a + sL_s)/K'_{cf} A \quad (6)$$

is to be closed by feeding the current feedback signal into a summing circuit inserted in lead 221, i.e., between the stabilizing circuit 220 and the PWM control and power circuit 222.

Furthermore, the gain constant $K'_{cf}$ in Eq.(6) denotes the transfer function of the armature current sense circuit a possible realization of which may be as illustrated in FIG. 1 where the current sense circuit consists of a current sense resistor 182 of value R and a differential buffering amplifier 187 with the associated resistors 183, 184, 189 and 190 of such value as to provide gain of $R_4/R_3$.

Therefore, with reference to FIG. 1, Eq.(6) implies that the load independence of a dc motor drive system is achieved by closing an inner positive armature current feedback loop incorporating current feedback circuit 199 whose transfer function is synthesized such to consist of proportional and derivative component given in Eq.(1) and illustrated in FIG. 1 and repeated here $$H(s) = (R_a+sL_s)/[R(R_4/R_3)A].$$

Although it was already mentioned in the summary of the invention it should be noted again that this same load invariance method applies if a current sense transformer is used instead of current sense resistor.

Figure 3:
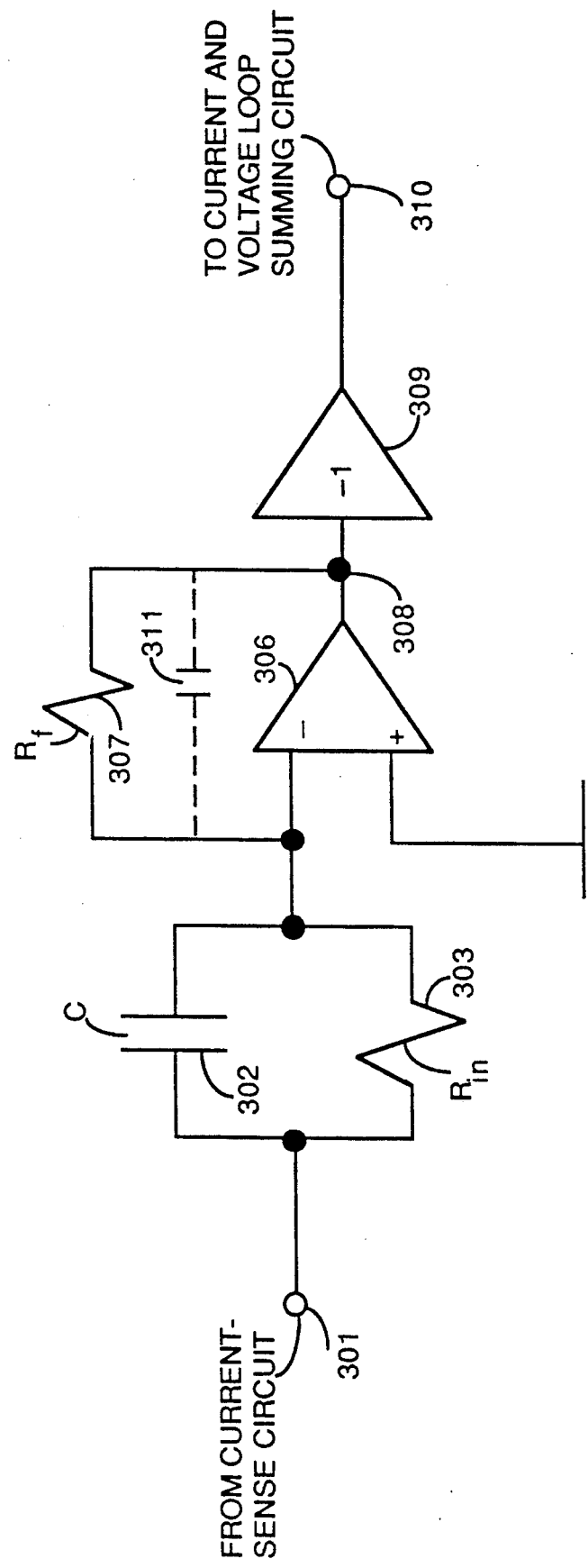
FIG. 3 is a schematic diagram of a current feedback circuit included in the circuit shown in FIG. 1.

The schematic diagram of a current feedback circuit 199 included in the circuit shown in FIG. 1 and of transfer function given in Eq.(1) is shown in FIG. 3.

The buffered and amplified current sense signal voltage is applied to terminal 301 to which capacitor 302 of capacitance C and resistor 303 of resistance $R_{in}$ are tied together. The other ends of capacitor 302 and resistor 303 are connected to the inverting input terminal of op amp 306 whose noninverting input terminal is grounded. In the negative feedback path of op amp 306 resistor 307 of value $R_f$ is connected. In parallel with resistor 307 a capacitor 311 of very small capacitance (several pF) may be connected to filter out noise and ripple in the current loop. The output of op amp 306 is connected by lead 308 to an inverter circuit which is symbolically represented by circuit 309 whose transfer function is $-1$ and whose output provides the required proportional and derivative component of the current signal at terminal 310.

The current feedback circuit component values for capacitance C, and resistances $R_{in}$ and $R_f$ are designed according to design equations provided by the synthesis method described earlier in connection with FIG. 1.

The transfer function of the current feedback circuit in FIG. 3 from its input 301 to its output 310 (neglecting the small value of the filtering capacitor 311) is $$H(s) = (R_f/R_{in})(1+sCR_{in}) \quad (7)$$

The design equations are obtained by equating Eq.(1) and Eq.(7) yielding $$R_f/R_{in} = R_a/[R(R_4/R_3)A] \text{ and } CR_{in} = L_s/R_a.$$

Using these design equations for synthesizing current feedback circuit of FIG. 3 the appropriate form and amount of current feedback signal is provided at the output terminal 310 of the current feedback circuit to provide the load independence of the dc motor drive system of FIG. 1.

Various changes and modifications may be made within the scope of the inventive concept. As an example one may realize current feedback circuit 199 in FIG. 1 using not necessarily dual-supply op amps but rather single-supply ones (especially when adding this circuit to an integrated-circuit PWM control chip already in existence) so that the topology of such a current feedback circuit is different from the topology of circuit shown in FIG. 3, however still operating on the same principles derived from Eq.(1).

We claim:

1. A method for synthesizing load independent direct current drive system comprising:

accepting a source of electrical energy of a constant direct current voltage at an input, coupling mechanically a direct current motor shaft to a load to be driven at an output, controlling a power flow from said input to said output, periodically enabling a power semiconductor switch in a power converter for the control of said power flow in a pulse width modulation manner, supplying a resultant control voltage signal for periodically enabling said power semiconductor switch, supplying a position feedback pulse train signal, feeding back the position feedback pulse train and comparing its frequency and phase with frequency and phase of a position command pulse train in a phase frequency detector in a negative feedback manner; thereby producing a position error voltage signal proportional to a difference in frequency and phase between the two pulse trains, supplying a velocity feedback voltage signal, feeding back the velocity feedback signal and comparing it with a sum of a velocity command voltage and the position error signal in a summing circuit in a negative feedback manner; thereby producing an algebraic sum of the velocity feedback signal and the velocity command and the position error signal, passing a signal obtained as said algebraic sum of three signals through a filtering and stabilizing network; thereby producing an error voltage signal proportional to said algebraic sum of the velocity feedback signal and the velocity command and the position error signal, sensing a current through a direct current motor armature, feeding back the sensed current signal through a current feedback circuit of a proportional and derivative function is a positive feedback loop with respect to said error voltage signal and summing the sensed current signal with said error voltage signal, supplying said resultant control voltage signal, obtained as the sum of said error voltage signal and the current signal fed through said current feedback circuit, for periodically enabling said power semiconductor switch to control the flow of power from the input electrical source to the output mechanical load, whereby the direct current motor shaft position and velocity is made independent of said load.

2. The method of claim 1 wherein said current feedback circuit of said proportional and derivative function in said positive current feedback loop is synthesized using an equation providing transfer function in laplace domain of said current feedback circuit $$H(s) = (R_a + sL_s)/[R(R_4/R_3)A]$$

in said equation $R_a$ being a wire resistance of a direct current motor armature, $L_s$ being a total inductance of the direct current drive system consisting of a sum of an armature inductance $L_a$ and any series inductance $L_b$, R being a resistance of a motor current sense device, $R_4/R_3$ being a gain of a buffering differential amplifier in a motor current sensing circuit, A being a voltage gain of a pulse width modulation control and power stage, and s being a complex frequency laplace variable in the transfer function H(s).

3. The method of claim 2 wherein said equation providing transfer function of said current feedback circuit is used for implementing said current feedback circuit as a differentiator circuit with a direct current path wherein said differentiator circuit with said direct current path is arranged to provide a differentiating the constant equal to $$L_s/[R(R_4/R_3)A]$$

and a direct current gain constant equal to $$R_a/[R(R_4/R_3)A],$$

$L_s$ being the total inductance consisting of the sum of the armature inductance $L_a$ and the series inductance $L_b$, R being the motor current sense device resistance, $R_4/R_3$ being the gain of the buffering differential amplifier in the motor current sensing circuit, A being the overall voltage gain of the pulse width modulation stage, and $R_a$ being the motor armature wire resistance.

* * * * *